United States Patent [19]

Owens

[11] 4,267,008
[45] May 12, 1981

[54] CORRUGATING MACHINE

[75] Inventor: James J. Owens, Ware, Mass.

[73] Assignee: Eastern Container Corporation, Springfield, Mass.

[21] Appl. No.: 78,088

[22] Filed: Sep. 24, 1979

[51] Int. Cl.³ .......................... B31F 1/20; B32B 31/04
[52] U.S. Cl. .................................. 156/462; 156/470; 156/547; 156/550; 156/556
[58] Field of Search ....................... 428/186, 184, 182; 156/205, 210, 462, 470, 472, 555, 556, 550, 363, 547

[56] References Cited

U.S. PATENT DOCUMENTS

| Re. 22,842 | 2/1947 | Hill | 156/470 |
| 1,199,508 | 9/1916 | Swift, Jr. | 156/210 |
| 3,077,222 | 2/1963 | Shanley | 428/186 |

Primary Examiner—Paul J. Thibodeau
Attorney, Agent, or Firm—Ross, Ross & Flavin

[57] ABSTRACT

In a corrugating system, a supplemental means for insuring that the liner and corrugated medium are properly conditioned with adhesive or bonding material along the entirety of its length and width of the bondable surface as the machine is starting up following down time to avoid subsequent board delamination.

1 Claim, 2 Drawing Figures

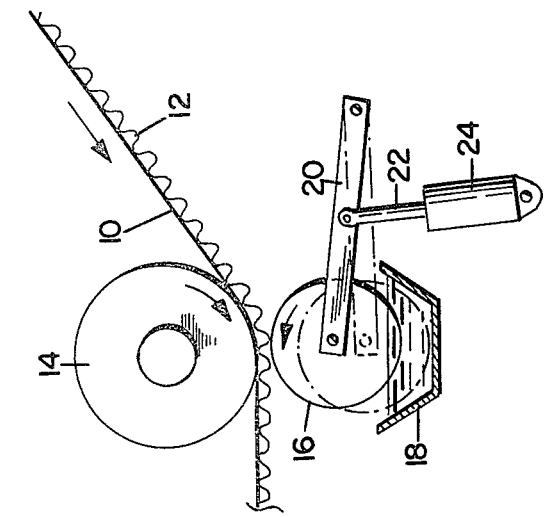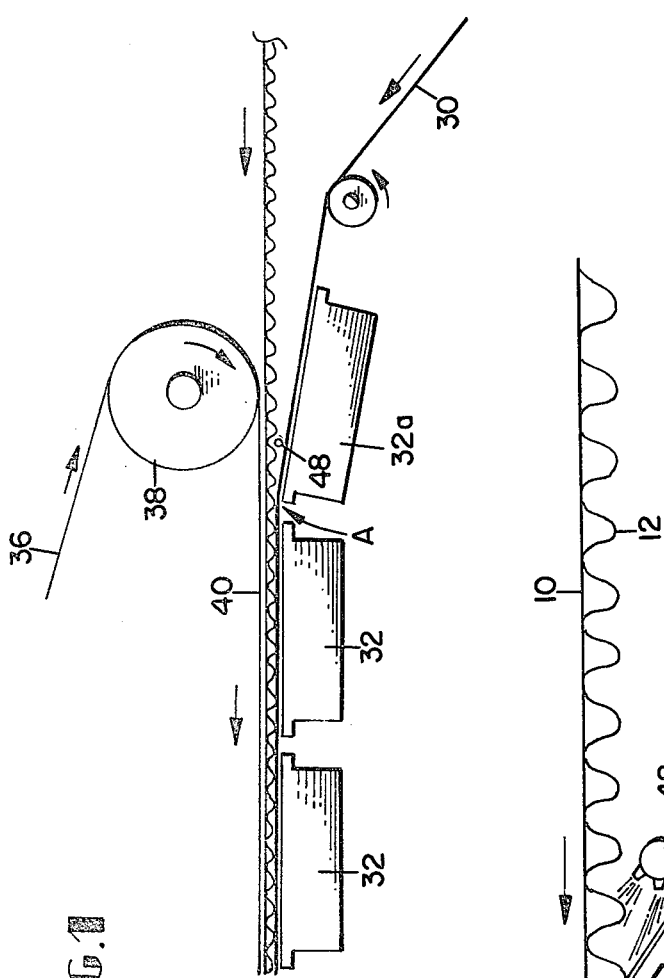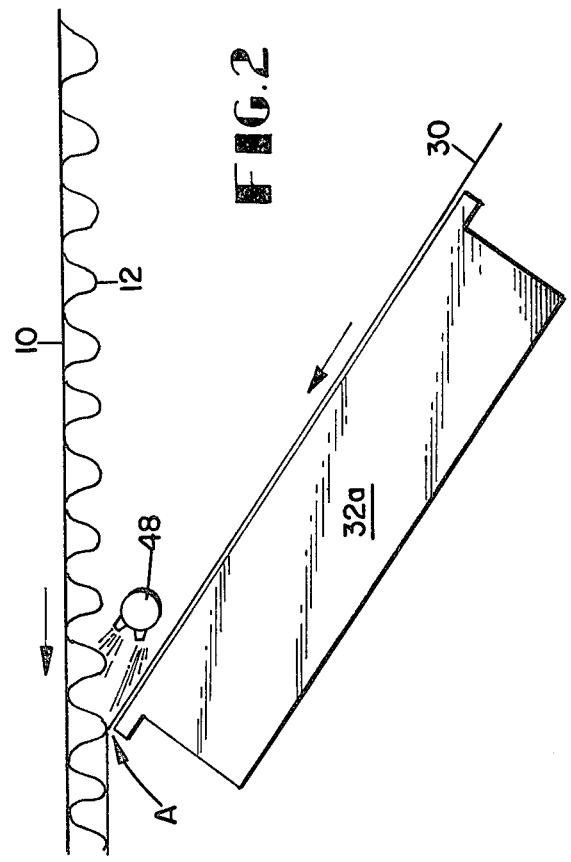

CORRUGATING MACHINE

My invention relates to the corrugating of cardboard and similar deformable materials, referred to generally herein as "paperboard", wherein two or more plies are brought together following the application of a suitable bonding material to insure the adherence of the two adjacent plies at all portions of the adhering surfaces.

Corrugated paperboard and containers made therefrom are widely used in the packaging industry whenever strength, light weight, and economy of construction are needed. The corrugated paperboard is generally formed by corrugating a flat sheet of stiff but inexpensive paper, made usually from semi-chemical pulp furnishes formed on a Fourdrinier machine, and the bonding to one or both sides thereof a flat sheet or sheets termed "liners" by means of adhesive placed on the outer ridge of the formed flutes of the corrugated sheet called the "medium" or "corrugating medium".

In the conventional corrugating process, the medium passes into a nip formed by two longitudinally toothed corrugating rollers rotating in mesh to form a series of parallel flutes, corrugations or undulations which are generally of substantially constant predetermined amplitude and wavelength. The toothed rollers are normally heated by steam so as to offer an operating temperature ranging from approximately 320° F. to 380° F. The medium is also subjected to preheating on a roll, steam heated from approximately 300° F. to 380° F. and showering with steam on one or bothsides before reaching the corrugating rolls in order to render it sufficiently plastic to mould and to accept the corrugating stresses without fracture or malformation of the flutes.

Several types of corrugated paperboard are currently produced for packaging applications. That in which a liner is adhered to one face only of the currugated medium is termed a "single-face corrugated board," and that in which liners are adhered to both faces of the corrugated medium is termed a "double-face corrugated board." The liner of the single face corrugated board is usually heated on a steam heated roll on the machine termed the "single-facer" or "corrugator" before being pressed against the corrugated layer or medium to the ridges of which adhesive has been applied.

After the board is formed, it is then passed through a heating and curing section where the glue is cured and the board is dried.

While a double-face corrugated board is referred to in this specification, it will be understood that the invention could apply to a single-face corrugated board with equal facility.

The specification discloses a corrugating system in the forming of a corrugated web comprised of an upper liner and a bottom liner and a medium sandwiched therebetween and bonded to the liners. The upper liner and corrugated medium bonded thereto will first pass through a glue machine section where the corrugated medium is passed by a rotating adhesive roll for the coating of the flutes with adhesive preparatory to passage to a double backer section for entrainment with the bottom liner and passage of the combined laminae over steam chests and under a double facer belt. The distance between the adhesive roll of the glue machine section and the point where bottom liner and corrugated medium are joined in the double backer section may be as much as 40 to 50 inches or even more.

In the forming of such a corrugated web, down time is frequently experienced due to a machine malfunction or the like.

It is that area on the bottom side of the medium which has just been treated with adhesive which is susceptible to drying in the event of downtime and it is this same area which upon machine restartup will bring to the double backer section a portion of the web some 40-50 inches or more in length, where the medium is so dired, thus to adversely effect the marriage of medium to bottom liner throughout that area represented by the dried adhesive.

In other words, the invention relates to a corrugating system in forming corrugated paper board involving a controllable adhesive shower which may be selectively controlled to control the adhesive content across the width of the web on that portion of the web where the bonding material has been applied to the high points of the corrugations but where the marriage of medium and bottom liner has not yet ensued and where machine stoppage for any reason whatever will result in the drying of that bonding material on that portion of the medium before machine startup again takes place.

The invention provides for the conditioning of the surface of this length of the medium with an additional or secondary spray of adhesive.

The invention provides a means for applying an adhesive and/or a remoistening agent to the medium and/or the liner of a web of corrugated material immediately preceding their line of contact until the additive adhesive and/or the properly moistened material reaches that line of contact in the double backer section.

The general object of the invention may be said to provide a consistent feed of material in a corrugated board forming machine by insuring that all areas of the appropriate medium surface are conditioned with an adhesive coating preliminary to the marriage of the respective plies constituting the corrugated board.

In the normal operating mode, adhesive is applied to the flute tips of the medium by the adhesive roll while the machine is running at operating speed.

When the medium slows to a stop, the adhesive roll drops away from the medium and keeps rotating to prevent an adhesive build up on the roll. This much is true of all corrugating machines.

Where the crucial problem arises is in the fact that, in the event of such a stoppage, there is a portion of that medium which will have passed the adhesive roll and will have been conditioned thereby but will not yet have reached the line of contact where coated medium is married to bottom liner.

During the stoppage interval, the adhesive so applied to the medium fluted tips may dry, depending upon the time interval involved.

When the machine is again started, the adhesive roll again is moved upwardly to contact the medium flute tips but ony after the web is travelling at an acceptable speed.

Because of the dryness of this adhesive, during such stops and slowdowns as may be necessitated by paper changes or machine malfunctions and the like, the board delaminates when it comes out of the drying section. This represents an obvious waste of material and leads to excessive material handling and scrap sorting and disposal. Too, it can lead to jams in the cut off and slitting sections or in other parts of the finishing machines.

In the drawings, which are diagrammatic representations of the mechanism by which my improved process may be practical:

FIG. 1 illustrates a portion of a corrugating machine or system known as that portion where the forming web is passed from the glue machine section to the double backer section for purposes of illustrating the concept of the invention; and FIG. 2 is an enlarged view of the FIG. 1 showing for purposes of showing more clearly the relationship of the corrugated paper board components and the supplemental spray apparatus of the invention.

As known, a web to be corrugated is passed over the surface of a corrugating roll having teeth which mesh with similar teeth on a second corrugating roll. The web passing between the two corrugating rolls is forced into a final corrugated condition and is set in this condition by the heat of the rolls, generally kept at over 300° F., the heat being generally supplied by steam circulated through the hollow interior of the rolls. This much is known and is not shown as it does not form a part of the invention.

Referring now to FIG. 1, there is illustrated schematically a portion of a double facer of a corrugated paper forming machine wherein a web of paper 10, called a top or upper liner, which has been previously joined at a single facer to a corrugated medium 12 is fed under a roll 14 and over an adhesive roll 16 which is rotatable through an adhesive trough 18 containing an adhesive or other bonding medium. Rotation of the adhesive roll allows the coating of the tops of the flutes of the underside of the corrugated medium as it is moved therepast.

The adhesive roll 16 may be adjustable, as for example by rotatably mounting upon a pair of swingable arms 20 which may be motivated as by the pistons 22 of cylinders 24 acting as a pair and driven by any conventional means (not shown). The adhesive roll 16 is likewise driven by a prime mover (not shown) so as to be rotative for the coating of the flutes with adhesive, before passage from the glue machine preparatory to passage to the double backer section for entrainment with a bottom liner 30 and passage of the combined laminae over steam chests 32 and under a double facer belt 36. The distance between the adhesive roll 16 of the glue machine section and the point A where bottom liner and corrugated medium are joined in the double backer section may be as much as 40 to 50 inches or even more.

It is that area on the bottom side of the medium 12 which has been treated with adhesive by roll 16 and which is liable to dry in the event of any downtime and it is this same area which upon machine restartup will bring to the double backer section a portion of the web some 40-50 inches or more in length where the medium is dry so as adversely to effect the marriage of medium to bottom liner.

In other words, the invention relates to a corrugating system in forming corrugated paper board involving a controllable adhesive shower which may be selectively controlled to control the adhesive content across the width of the web to ensure adequacy of application of adhesive along all portions of the web components.

The web is passed to the double backer section where the bottom liner 30 from a roll (not shown) is led into confronting relationship with the top liner (medium combination, being passed over a first steam chest 32a immediately prior to such confrontation at A and subsequently over a series of second steam chests 32 while an endless double facer belt 36 entrained around rolls such as 38 has a horizontal reach 40 which bears downwardly upon the new married web.

Immediately forwardly of point A, a shower 48 is disposed transversely of the forming web and is capable of forming a supplemental spray of bonding material forwardly in the direction of point A and will be rendered operative by means not shown upon machine start up and will continue operation for a timed interval by which time the leading end of the newly glued portion of the corrugated medium will have arrived at the supplemental shower zone.

I claim:

1. In a corrugated board making machine comprising apparatus for the forming of a corrugated web consisting of upper and lower liners and a pre-corrugated medium sandwiched between and bonded to the liners and wherein the upper liner and corrugated medium are first bonded together prior to passage through a gluing section for the adhesive coating by a primary adhesive applying means of the yet exposed flutes of the corrugated medium preliminary to passage to a double backer section for entrainment with and bonding to the lower liner, the improvement adapted expressly for and operative only in such machine downtime situations as where a length of the forming web carrying a section of yet exposed flutes of the corrugated medium and charge of adhesive is exposed while stopped in transit before entrainment with and bonding to the lower liner with a resultant drying of the adhesive charge and comprising:

a supplemental adhesive applying means disposed transversely of the forming web and between the lower liner and the corrugated medium inboard of their point of joinder for spraying a controlled shower of adhesive in the nip, and timing means rendering the shower operative for an interval commencing only upon machine start up following a down time situation and until the newly glued portion of the corrugated medium arrives at the nip.

* * * * *